March 24, 1931.   H. L. BOYER   1,797,518
STORAGE BATTERY CONTAINER
Filed Dec. 9, 1926
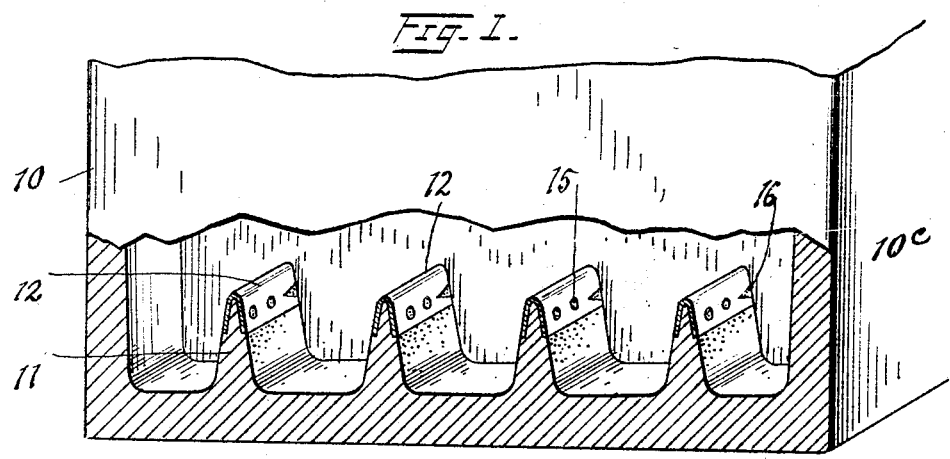
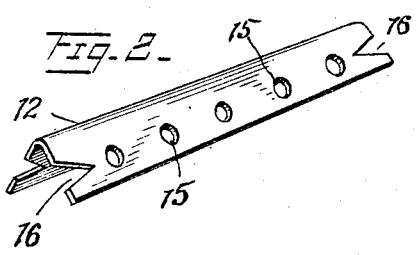
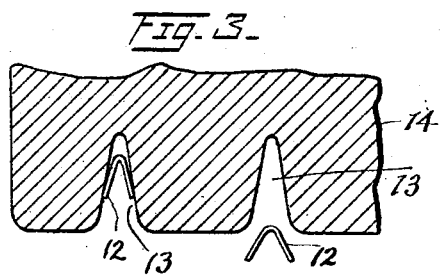
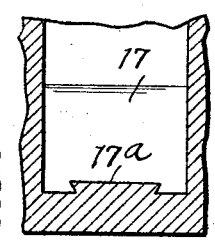
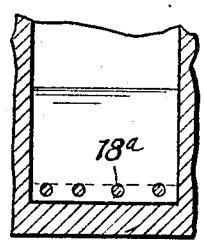
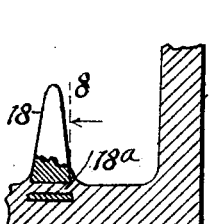
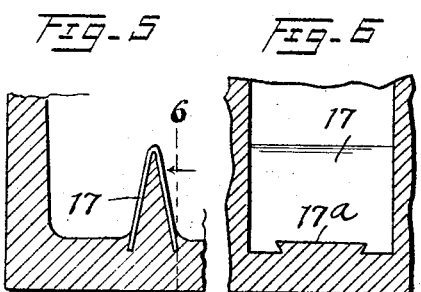
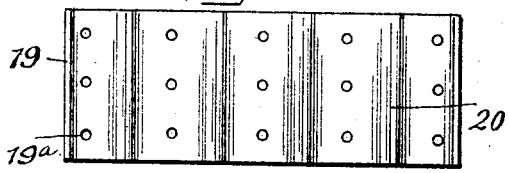
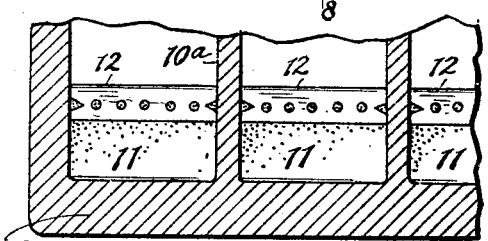
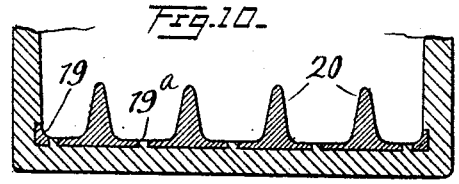

Patented Mar. 24, 1931

1,797,518

UNITED STATES PATENT OFFICE

HARRY L. BOYER, OF TRENTON, NEW JERSEY, ASSIGNOR TO JOSEPH STOKES RUBBER COMPANY, OF TRENTON, NEW JERSEY, A CORPORATION OF NEW JERSEY

STORAGE-BATTERY CONTAINER

Application filed December 9, 1926. Serial No. 153,531.

This invention relates to storage battery containers which are molded from suitable acid resistant materials. At present there are two distinct types or kinds of these containers produced, one known as hard rubber containers formed of hard rubber compound which hardens as the result of vulcanization and the other known as composition containers which are molded from compositions generally having a bituminous base and hardening on cooling after the molding operation. My invention has particular reference to storage battery containers formed from compositions other than rubber or to the "composition" type of containers.

These molded storage battery containers are generally formed with several compartments, one for each cell, and, at the bottom of each cell, bottom rests are provided to support the battery elements, these bottom rests being in the form of upstanding ribs which are, of course, in the molding operation, formed integral with the bottom and the side walls of the compartments.

In the hard rubber containers, the bottom rests have sufficient inherent strength to stand up or retain their original shape under the weight of the battery elements, but when the containers are formed of compositions other than rubber, such as those having a bituminous base, the bottom rests do not have the requisite strength to resist the weight of the battery elements, especially as it is desirable that the bottom rests be tapered and narrow at the top so as to shed oxides which may drop down from the plates.

The present invention aims to overcome this difficulty by suitably reenforcing or strengthening the bottom rests either by capping, covering, or otherwise reenforcing the rests with a relatively hard material, such as hard rubber, or by forming the bottom rests of a relatively strong material other than the composition employed for the remainder of the container.

The invention may be further briefly summarized as consisting in certain novel details of construction and combinations and arrangements of parts which will be described in the specification and set forth in the appended claims.

In the accompanying sheet of drawings, Fig. 1 is a fragmentary perspective view showing a portion of a storage battery container with bottom rests reenforced in accordance with one form of my invention, certain portions being broken away and in section; Fig. 2 is a perspective view of one of the reenforcing caps such as utilized in Fig. 1; Fig. 3 is a sectional view showing the lower portion of the core which is used in molding the containers and illustrating particularly the tapered slots in the bottom of the core, and the manner in which the reenforcing caps may be inserted in the slots prior to the molding operation; Fig. 4 is a fragmentary sectional view of the lower part of the container showing the several compartments of the container and the capped ribs in elevation; Fig. 5 is a fragmentary sectional view showing another way of reenforcing the ribs; Fig. 6 is a sectional view along the line 6—6 of Fig. 5; Fig. 7 is a view similar to Fig. 5 showing another modification, the rib being here formed in its entirety of a hard material such as hard rubber; Fig. 8 is a section substantially along the line 8—8 of Fig. 7, looking in the direction indicated by the arrow; Fig. 9 is a plan view of an insert which may be utilized to form all the different bottom rests for a compartment; and Fig. 10 is a sectional view taken lengthwise through the bottom of a compartment with the bottom rests formed from the insert of Fig. 9.

Referring now to the drawings, 10 represents the container which is molded from suitable composition in one unitary piece or structure. As far as my invention is concerned, it may have merely one compartment, but generally the container has a plurality of compartments, in which event it will be provided with integrally formed partitions 10ª (Fig. 4).

Although containers formed of hard rubber composition have proven by practice to be very satisfactory, in an effort to reduce the cost, containers formed of compositions other than rubber, such as those already mentioned, have been introduced, but, as previously explained, the compositions of which these containers are formed are generally not hard enough to give adequate strength to the bottom rests to support the battery elements without sagging, this being true particularly if the battery employing the composition case is used in an elevated temperature, as when used as a starting and lighting battery on a motor vehicle. According to my invention, specially formed or reenforced bottom rests are employed, as will now be described.

In the constructions illustrated in Figs. 1 and 4, bottom rests 11 are formed mainly of the same composition that forms the remainder of the container, but they are reenforced at the top by caps 12 of a relatively hard inert material. I have found that reenforcing caps formed of hard rubber, V-shaped in cross section, answer the requirements very effectively. These reenforcing caps 12 can be inserted in the slots 13 of the core or mandrel 14 utilized in forming the compartments, as illustrated in Fig. 3, and in the molding operation these caps are forced up into the upper ends of the slots and become embedded in the composition of which the container is formed. They are preferably provided with openings which become filled with the composition so that the latter and the caps will be thoroughly and permanently interlocked together. In this instance, the caps are provided with perforations 15 between their ends and with V-shaped notches 16 at their ends.

It will be observed that the reenforcing caps, when applied as described, form the top portions of the bottom rests and that the battery elements will rest directly thereon. These reenforcing strips may have the same length as the width of the compartment, that is to say, their ends may be flush with the side walls of the compartment, or they may be somewhat longer than the width of the compartment, in which event they will be embedded in the side walls.

It is not necessary that the reenforcing strips simply cover the upper portions of the bottom rests, as they can be extended down toward the bottom of the container as far as desired and may cover the rests entirely, as indicated in Figs. 5 and 6, where the reenforcing strips which are again preferably formed of hard rubber completely cover the sides and top of the composition portions of the bottom rest, and, in this instance, even have their bottom edges embedded in the bottom of the container. These strips may be interlocked with the composition in numerous ways as by forming openings in the strips, in the manner indicated in Fig. 2, but in this instance the bottom edges of the strips 17 have dovetail notches 17$^a$ cut therein so as to interlock with the composition forming the bottom of the compartment.

Instead of forming the bottom rests partly of the composition and partly of the relatively hard material which reenforces the composition, the bottom rests may be formed entirely of inserts of the relatively hard material, such as rubber. One way of doing this is indicated in Figs. 7 and 8, wherein the composition case has bottom rests 18 preferably of hard rubber formed integral therewith. These bottom rest inserts can be interlocked with the composition as by extending the lower portions down into the composition forming the bottom of the container, and if desired, the embedded lower portions of the rests 18 may have suitably formed perforations or openings 18$^a$ adapted to be filled with the composition so as to increase the interlocking action.

With the arrangement shown in Figs. 7 and 8, the bottom rests for each compartment are individual elements which are designed to be inserted into the slots 13 of the core in much the same way as indicated in Fig. 3. However, it is not necessary that the several bottom rests of each compartment consist of separate inserts but the several inserts may be formed in one piece, as indicated in Figs. 9 and 10, where the bottom of the case has embedded in it an insert 19 which extends the full width and length of the compartment, and, in fact, forms the bottom thereof, this insert comprising a base which is embedded in the bottom, and, in this case, also in the upright walls of the compartment and is provided with upstanding ribs on which the battery elements are designed to rest. If desired, the insert may have openings 19$^a$ which in the molding operation are filled with the composition and which enhance the interlocking action.

Above I have illustrated several different ways of forming the ribs so that they will possess the requisite hardness and strength to retain their original shape and avoid sagging under the weight of the battery elements. In the embodiments illustrated the bottom rests are formed in whole or in part of an inert material which is harder and has greater heat resistance, that is to say has less tendency to soften under the action of heat than the material forming the remainder of the container, but while I have shown several forms of my invention the desired results may be obtained in still other ways, and, therefore, I do not wish to be confined to the details or arrangements illustrated but aim in my claims to cover all modifications and changes which do not involve a departure from the spirit and scope of my invention in its broadest aspects.

Having thus described my invention, what I claim is:

1. A storage battery container molded from plastic material, and having at the bottom thereof an upstanding bottom rest for supporting the battery elements, said bottom rest having a cap formed of a material harder than that of the container, said cap having openings therethrough, and said molded material extending into said openings, whereby the cap is locked in place.

2. A storage battery container molded from a plastic material and provided at the bottom thereof with an upstanding battery element support, said support comprising material which is harder than the material of which the remainder of the container is formed, said hard material having openings therethrough, and said molded material extending into said openings, whereby the hard material is locked in place.

3. A storage battery container molded from a plastic material, said container having a bottom wall and a bottom rest extending upwardly therefrom, said bottom rest comprising a member formed of material harder than that of which the remainder of the container is formed, said member extending from the top of the bottom rest downwardly into said bottom wall, and the material of the bottom wall extending into said member.

4. A storage battery container having a bottom wall molded from a plastic material, and a bottom rest formed of molded material harder than the material of said bottom wall, said bottom rest being embedded in the bottom wall and having openings therethrough into which the material of the bottom wall extends for locking the bottom rest in place.

In testimony whereof, I hereunto affix my signature.

HARRY L. BOYER.